United States Patent [19]
Lahaye

[11] 3,768,512
[45] Oct. 30, 1973

[54] DAMPER VALVE

[76] Inventor: Paul G. Lahaye, 620 Shore Rd., Cape Elizabeth, Maine 04107

[22] Filed: Dec. 6, 1971

[21] Appl. No.: 205,216

[52] U.S. Cl. .............................................. 137/601
[51] Int. Cl. ............................................. F23l 13/00
[58] Field of Search ............... 137/601, 15.1, 15.2; 49/68; 251/212

[56] References Cited
UNITED STATES PATENTS

| | | | |
|---|---|---|---|
| 3,011,518 | 12/1961 | Day et al. | 137/601 |
| 3,080,707 | 3/1963 | Vetter | 137/15.1 |
| 1,659,880 | 2/1928 | Kauffman | 251/212 |

Primary Examiner—Robert G. Nilson
Assistant Examiner—Edward Look
Attorney—Wolf, Greenfield & Sacks

[57] ABSTRACT

A damper valve for positively closing gas flow in one position and minimizing resistance to gas flow in other positions. A plurality of streamline members are positioned in a fluid passageway in operative relationship to each other. The streamline members are expanded to change their outer configuration when it is desired to restrict gas flow in the passageway. Structural means within each streamline member act to expand the skin of each member into abutting contact with an adjacent member or passageway side to close the passageway to gas flow even under extremely high temperatures of operation and large temperature gradients. The seal formed is capable of adapting to differential thermal expansion since it is formed by at least one flexible member. The elastic deforming of the metal skin provides good sealing in the closed position with minimum leakage and minimizes pressure drop due to turbulence in open positions.

15 Claims, 7 Drawing Figures

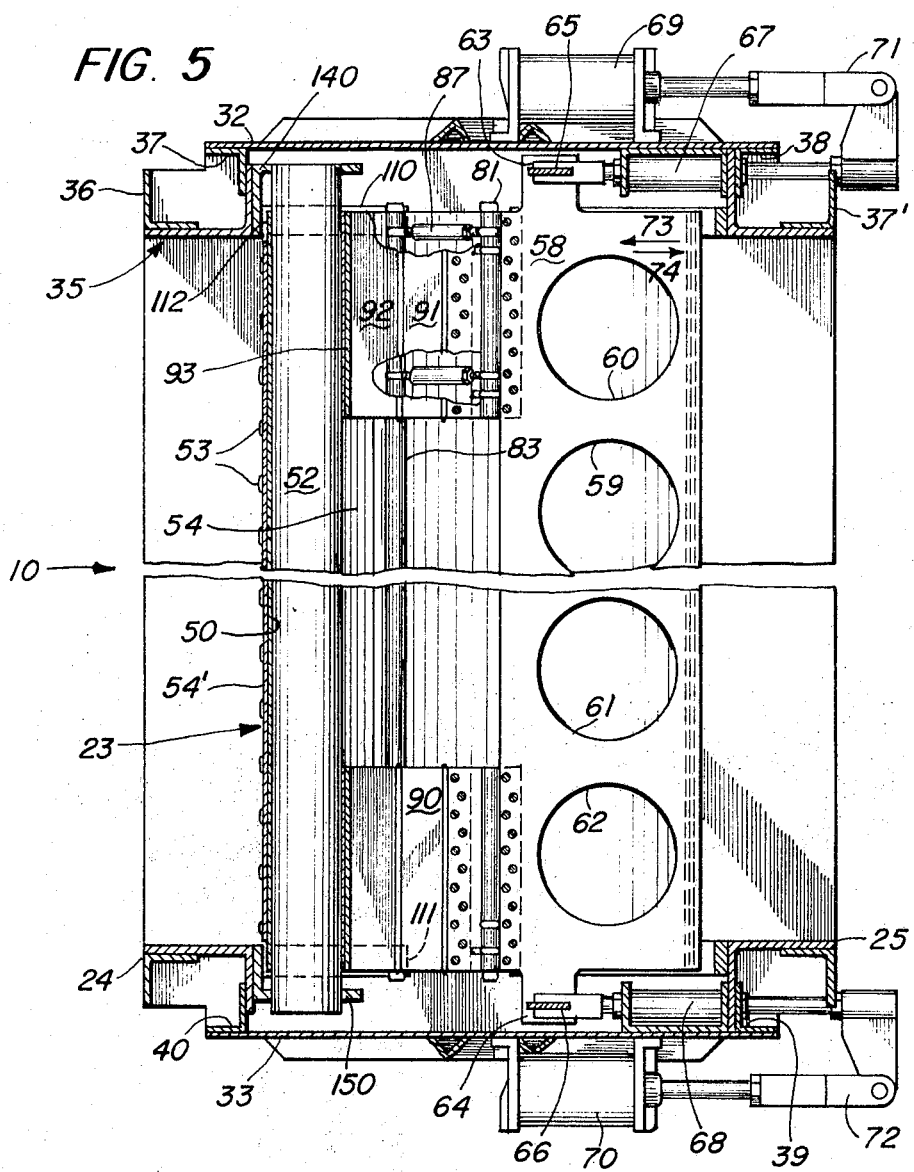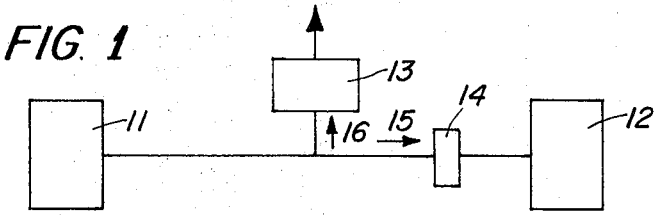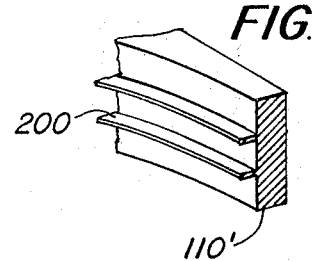

DAMPER VALVE

BACKGROUND OF THE INVENTION

In many industrial power and process applications, large volumes of hot combustion gases are transmitted through large ducts or passageways often ranging in size from 4 to 20 feet on each side. A typical example is the use of a gas turbine exhaust gas to fire a boiler in a combined cycle power plant. To control such systems it is desirable to vary or even completely interrupt the hot gas flow by means of a damper valve. Conventional damper valves exist in the form of butterfly or vane-type dampers and have generally been proven to be unsatisfactory particularly when it is desired to completely interrupt the gas flow. A major source of difficulty stems from the relatively large variations in temperature in the gas stream which produce severe distortion of the valve damper parts positioned in the stream. Good sealing is often prevented because of the distortion. The problem of temperature gradients is further aggravated by the fact that such dampers are designed to carry heavy pressure loads due to the pressure of the gas stream acting over large surface areas making solidly constructed large parts necessary and further aggravating the distorting effect of the temperature gradients.

SUMMARY OF THE INVENTION

It is an important object of this invention to provide a highly efficient, reliable, damper valve for closing or varying flow of hot fluids.

It is another object of this invention to provide a valve in accordance with the preceding object which valve provides a resilient seal in the closed position and minimized pressure drop due to turbulence in the open position.

According to the invention, a damper valve particularly useful for damping the adjusting flow of hot gases comprises a duct or gas passageway. A plurality of damper members are arranged in operative relationship to each other in the gas passageway. Each of the damper members define a streamline strut-shaped outer flexible skin configuration. Means are provided for changing the skin configuration of each member to cause the skin to vary or close the passageway to gas flow when desired.

It is a feature of this invention that the valve damper member can be elastically expanded to uniformly fill the passageway opening and cut off gas flow even under conditions of large temperature gradients, yet, always presents a low drag profile during gas flow. Preferably the streamline damper members are symmetrically shaped struts which offer minimal pressure loss under normal conditions and which can be elastically expanded to contact each other and side walls of the passageway. In this way, areas of contact between the damper members and side walls are maintained when the valve is closed. The seal formed is capable of adapting to distortion caused by differential thermal expansion since it is formed by at least one flexible member biased to the sealed position.

A sealing plate is used at the top and bottom of the passageway for contact by the streamline members when in their expanded position to effect a positive seal even though thermal expansion can cause longitudinal variation in the streamline members.

The streamline members are preferably elongated and positioned substantially with their elongated axes parallel to each other. Thus, when the skin of such members is expanded by internal mechanical structures, adjacent skins touch each other over a surface of contact which forms a fluid tight seal even under high temperatures as in the range of 900°F and above. Buckling of the skin is prevented at such high temperatures because of the mechanical pressures exerted as well as by the use of the skin which preferably has a coefficient of thermal expansion lower than that of the internal mechanical structures. Preferably the skin of the damper members is thin to permit flexing and expansion without permanent distortion and to avoid fatigue.

It is another feature of this invention that no sealed pivots or lubricating bearings need be used in the valve. The damper members can be actuated by low actuating force in simple linear motions. The weight of the damper members is carried by a fixed post rather than a movable pivot.

BRIEF DESCRIPTION OF THE DRAWINGS

The above and other features, objects and advantages of the present invention will be better understood from the following specification when read in conjunction with the accompanying drawings in which:

FIG. 1 is a diagrammatic showing of a system incorporating a preferred embodiment of the present invention;

FIG. 5 is a cross sectional view thereof taken through line 5—5 of FIG. 4;

FIG. 6 is a showing of an alternate embodiment of an end seal thereof; and

DESCRIPTION OF PREFERRED EMBODIMENTS

Figure 2:
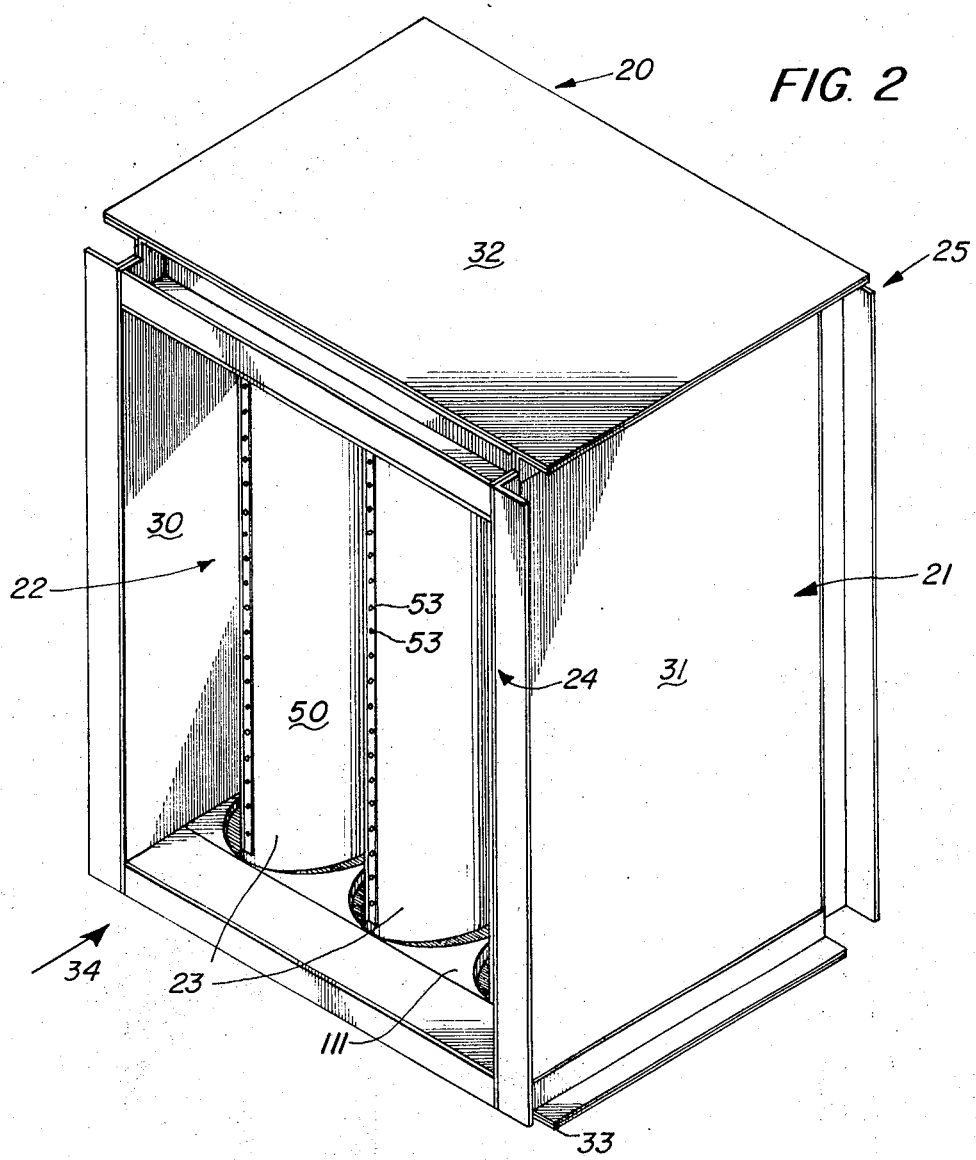
FIG. 2 is a front perspective view of a damper valve in accordance with a preferred embodiment of this invention.
Figure 3:
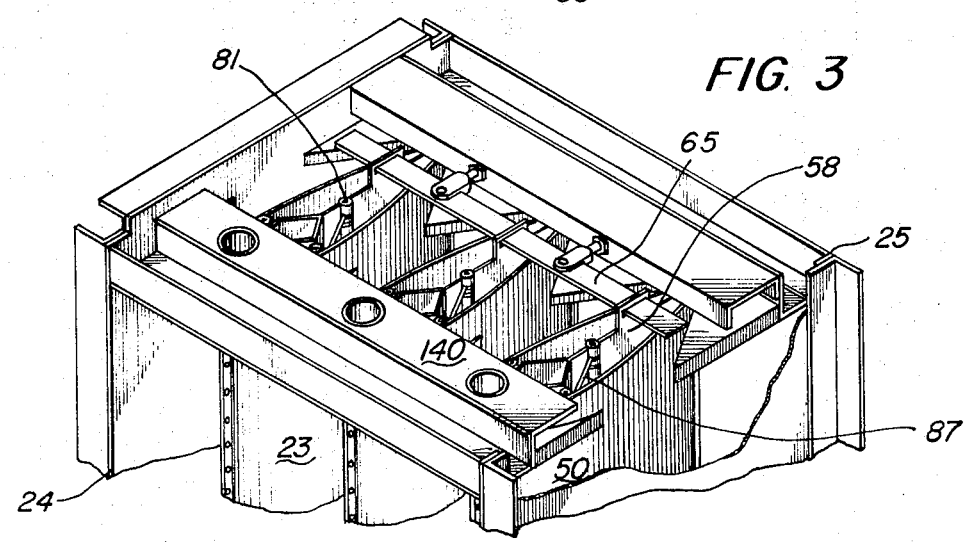
FIG. 3 is a fragmentary perspective view thereof with the cover removed.

With reference now to the drawings, a system 10 is shown for utilizing exhaust gas from gas turbine 11 to heat a steam boiler 12 with the gas passing through either or both of a bypass damper 13 or a boiler damper 14. Either or both of dampers 13 and 14 can be constructed in accordance with the preferred embodiment of this invention illustrated generally at 20 in FIG. 2. The damper 20 comprises a housing 21 providing a fluid passageway 22 in which are arranged a series of damper members 23 for allowing full flow of gas through passageway 22 from front 24 to rear end 25 or partially or completely closing the passageway 22 if desired. The damper members 23 are actuated to expand and contract by mechanical structures in each which are designated generally at 26 in FIG. 4.

The system of FIG. 1 is conventional in that exhaust gas from the gas turbine 11 is passed in the direction of arrow 15 and directed either to the steam boiler 12 through the damper 14 or a bypass damper 13 in the direction of arrow 16 and from there to another user or dump. In some cases, partial flow can be obtained in the direction of arrow 15 and arrow 16. Thus, dampers 13 and 14 must have the capability of allowing substantial flow, partial flow or completely restricting flow in order to obtain the variations wanted. This has been extremely difficult in the past because of the extremely hot nature of the gases, often of 900° F or above. When damper valves 13 and 14 are in the form of damper valve 20, necessary variation and restriction to flow can easily be accomplished with positive closing of either valve when desired.

The damper valve 20 has rigid, metallic side wall plates 30 and 31 with enclosing rigid, metallic cover plate 32 and rigid, metallic bottom plate 33 forming a rectangular duct-like arrangement and defining passageway 22 which allows gas flow in the direction of arrow 34 from the front end 24 to the rear end 25. This structure may or may not be thermally insulated either internally or externally to suit specific needs of any particular application. Ends 24 and 25 are connected to suitable ducting for fluid flow in use. The plates 30–31 are positioned by a frame 35 of welded or otherwise joined angle irons as best shown in FIGS. 2–5. The frame 35 is made up of a rectangular angle iron section at the front which provides an outwardly extending rectangular rim face flange 36 for attachment of fluid ducting and an outwardly extending rear face flange 37' for attachment of ducting to the rear. The frame 35 carries welded angle iron members 37, 38, 39 and 40 forming upper and lower peripheral rims to which the cover plate 32 and bottom plate 33 are joined in sealing relationship. In the preferred embodiment, the rectangular passageway 22 has a width of 4 feet and a height of 6 feet. The angle irons are preferably one-fourth inch thick irons with the cover plates having a thickness of one-fourth inch and preferably formed of iron based material resistant to deterioration at high operating temperatures as for example above 900° F. The housing resists deformation at pressures as high as 20 inches of water which is necessary since the pressure differential between the front end of the housing and the rear end of the housing when the valve is in the closed position can be as high as this value.

Figure 4:
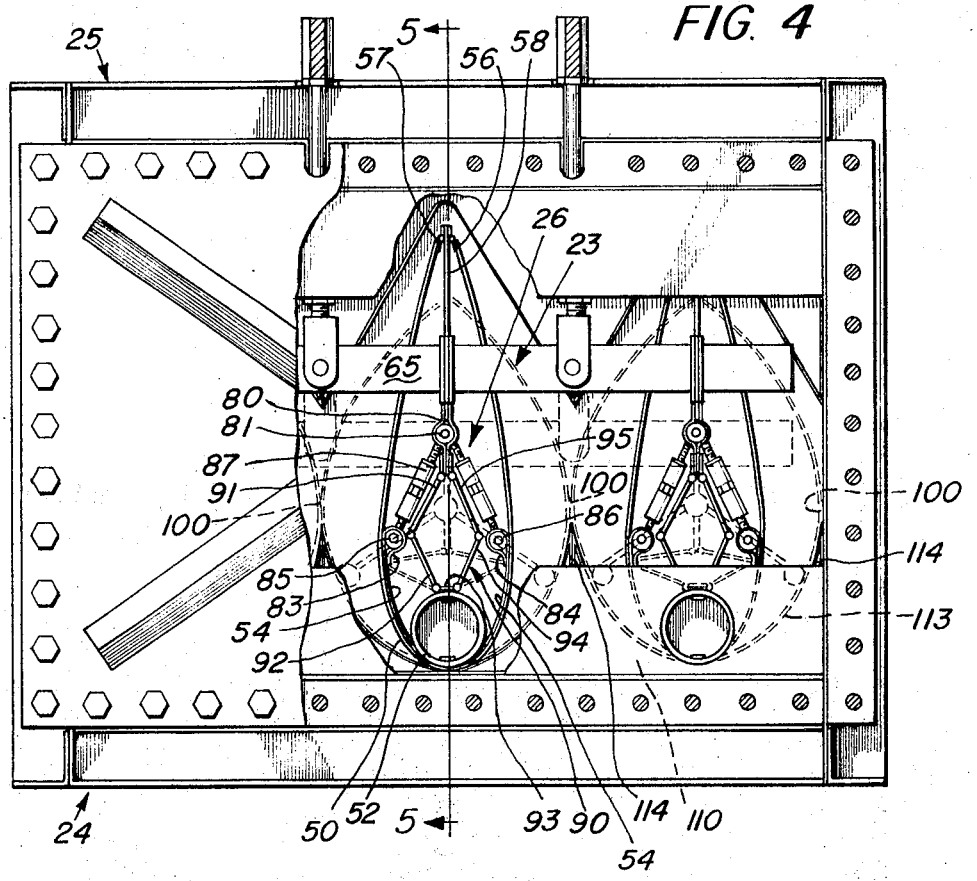
FIG. 4 is a top view thereof with portions removed and showing two positions of the valve.

In the preferred embodiment, three streamline strut damper members 23 are positioned with their elongated axes parallel to each other and extending substantially from top to bottom of the housing. Each of the streamline strut damper members are identical and thus only one will be fully described. As best shown in FIGS. 4 and 5, center damper member 23 comprises an outer flexible streamline strut skin 50 preferably formed of a thin material such as 26 guage precipitation hardened steel sheet. Other high temperature resistant alloy sheets preferably having a thermal expansion coefficient lower than that of the internal structural mechanism and the stiffener plate by preferably at least $0.5 \times 10^{-6}$ inch per inch per °F can be used. Skin 50 has a streamline shape and in its unexpanded configuration conforming to the open position of the valve, basically comprises two airfoil surfaces joined to each other substantially at the front and back straight edges. In the preferred embodiment, the chord length of each strut is 2 feet and its width is 7 inches. It is preferably formed from a single sheet of material bent about a supporting tube 52 and riveted thereto by a line of rivets or other securing means 53. The support tube 52 extends from top to bottom of the skin 50 and beyond as best shown in FIG. 5. Preferably a pair of spaced stiffening curved metallic backup plates 54 are seam welded in place on the inside surface of the skin (FIG. 4). The backup plates 54 (FIG. 4) provide a flex bar allowing resilient movement of the skin to flex between the line of rivets 53 and each forward edge of each backup plate 54. A thin, rigid support strip 54' overlies the front edge of the skin and cooperates in providing the flex bar action. The skin is then formed and joined at its rear edges to hinges 56 and 57 which are in turn attached to a rigid drive plate 58 having cutout portions 59, 60, 61 and 62 which reduce the weight of the drive plate. The drive plate 58 acts to hold the skin in its contracted or unexpanded position shown in full lines in FIG. 4, and as a part of an internal support structure to expand the skin to the configuration shown in dotted lines in FIG. 4.

The drive plate 58 has outwardly extending top and bottom tabs 63 and 64 to which are connected upper and lower actuating bars 65 and 66. The actuator bars 65 and 66 are linked to actuator push rods 67 and 68 respectively which are in turn linked to a series of pneumatic actuators (air cylinders) 69 and 70, through conventional actuating linkages 71 and 72 to enable movement of the drive plate in the direction of arrow 73 or arrow 74 as desired. In the preferred embodiment, two identical top cylinders 69 and two identical bottom cylinders 70 along with associated actuating mechanisms are used and activated simultaneously to cause desired simultaneous movement of the drive plates 58 in each member 23.

The drive plate 58 has an elongated double flange bearing strut 80 (FIG. 4) in which is mounted a pivot post 81 extending from top to bottom of the drive plate.

The supporting stiffening backup sheets 54 lie behind and cover a forward portion of the skin 50 and are welded to the skin at space portions on either side of post 52. The supporting plates 54 are preferably formed of carbon steel having a thickness of 18 guage. The rearward side edges of the supporting plates 54 carrying cylindrical bearings 83 and 84 in which are mounted pivot posts 85 and 86. The rearward extension is limited to provide anti-buckling action in the closed valve position, yet, to avoid interferring with the flexible seal action between adjacent skins. Four vertically aligned push rod turnbuckle members 87 extend between posts 81 and 85 on one side and similarly four identical turnbuckle push rods extend between posts 81 and 86 on a second side of each member 23. The turnbuckle members provide for adjustment as desired. The push rod turnbuckle member 87 act to expand the flexible skin 50 into the configuration shown in dotted lines in FIG. 4 when the drive plate 58 is moved in the direction of arrow 73 (FIG. 5).

A top and bottom series 90 of hinge plates are positioned along the vertical axis of the member 23. As best shown in FIG. 4, each hinge plate 91, 92, 93, 94 and 95 is hinged together by link pins at their edges. Plate 93 is rigidly attached to post 52 by rivets with plates 91 and 95 being firmly supported by attachment of adjoining rear hinge plates to strut 80. The hinge plates act to cantilever the wieght of the streamline strut skin. Thus, substantially the entire weight of the internal mechanical structure is mounted on post 52 and does not stress the skin 50.

The above described internal structural support acts to permit positioning of each streamline strut member 23 in its contracted position allowing minimum pressure drop through the valve and to change the configuration of the skin substantially uniformly through a series of positions ending with the fully closed position of the valve shown in the dotted lines in FIG. 4. At any point in between fully opened and fully closed, the damper member 23 maintains some of its streamline configuration. Thus, fluid flow can be partially or fully shut off as desired without seriously increasing gas turbulence or resistance to flow due to the shape of the closure means.

Since the skin 50 is flexible and resilient, it can be resiliently moved through a voluminous series of openings and closings without substantially fatiguing the metal or detracting from the life span of the valve. The stress in the skin is not permitted to exceed the fatigue limit of the skin material. The design parameters to be considered include (a) minimizing stress and pressure drop by selecting long chord lengths (front to back length of damper member cross section), (b) large width of strut cross section gives low stress but must be limited or balanced to optimize desired pressure drop, and (c) thin sheet metal to minimize fatigue stress but must be thick enough not to buckle in closed position of valve when supported by other internal structure. It has been found that a chord length of about 2 feet and a thickness ratio (width to chord length) of 30 percent is advantageous for most practical applications.

In the fully closed position of the valve, as shown in FIG. 4, adjacent skins meet along contact area portions 100 and are pushed toward each other to form resilient seals extending from top to bottom skin surfaces of the valve. The side members 23 form such seals 100 with the side walls of the housing. The skin contact areas 100 provide sufficient areas of contact to provide good sealing. The contact areas 100 are substantially planar. It should be noted that the flexible portion of the skins contact each other thereby allowing conformance of one skin to any irregularity which may be found in the other along the seal contacting areas which are resiliently biased toward each other. Such irregularities can be caused by differential thermal expansion.

Preferably the internal support and expanding and contraction mechanism has a higher coefficient of thermal expansion than the material of the skin so that the skin actually stretches as the valve is heated tending to prevent unwanted buckling and allowing retention of the streamline configuration.

The above discussion explains the side to side sealing action of the members 23. However, the seals at the top and bottom of each member are provided for by top and bottom seal plates 110 and 111 each of which is identical and acts in the same manner. Seal plate 110 is mounted in the housing as at 112 in a fixed position as by welding or bolting to an angle iron support of the frame.

The seal plate 110 defines curved portions 113 with four cusps 114 operatively located with respect to each of the damper members used and the side walls. As best seen in FIG. 4, the curved sections are designed to conform to the expanded front configuration of the streamline strut members 23. Thus, upon full expansion of the members, contact is made along the planes of the top and bottom seal plates by each streamline member thereby fully sealing and closing the valve along the top and bottom. In some cases, the seal plate surfaces aong curved portions 113 comprise a series of preferably parallel ridges to enable formation of a labyrinth seal at top and bottom of the valve. This structure is generally illustrated in FIG. 6 where vertical surface 110' has projecting ribs 200 against which the skin 50 is resiliently pressed to form a labyrinth seal.

It is a feature of this invention that each of the streamline members 23 are positioned in the housing by identical means which allow for expansion and contraction during changes in temperature. Thus, as shown in the drawing, the center member 23 is attached to the housing only through the linkage provided by the actuator bar 65 which allows some slight degree of movement under expansion and contraction and by the mounting post 52 which is fixed to the housing only at one end. The mounting post 52 mounts in holes provided by top and bottom angle irons 140 and 150 (FIG. 5) which angle irons are welded to the frame. The upper end of post 52 is welded or otherwise fixed to angle iron 140 with no fixed joint with angle iron 150 at the bottom. Thus, expansion and contraction of the posts merely causes the lower end of the posts to slide in the lower holes provided in the angle iron 150. This mounting maintains the members 23 in parallel array, yet, allows for expansion and contraction thereby permitting good sealing.

Figure 7:
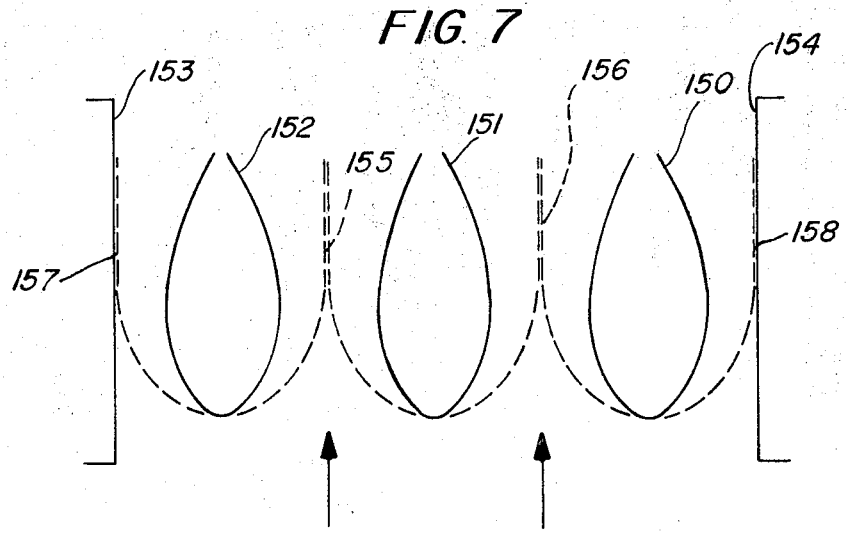
FIG. 7 is a semidiagrammatic showing of an alternate embodiment thereof.

An alternate embodiment of the invention is diagrammatically illustrated in FIG. 7 wherein streamline strut damper members 150, 151 and 152 having the outer configuration and construction of members 23 are mounted in a passageway defined by side walls 153 and 154. In the fully opened position shown in full lines, the streamline strut members permit fluid flow without causing turbulence thereby maximizing fluid flow. When it is desired to close fluid flow, rear portions of each damper member are opened as shown by the dotted line position to contact each other along surfaces 155 and 156 and to contact the side walls along lines 157 and 158 thereby forming seals in the same manner as the seals formed by members 23. Thus, resilient skins 50 are used along with associated backup plates 54. However, the skin is not hinged together at the rear line as at 56 and 57 of the embodiment of FIG. 1. The internal support structure is suitably designed to permit resilient sealing at contact area and at top and bottom seal plates with the same sealing action as in the embodiment of FIG. 1.

While specific examples of the present invntion have been shown and described, it should be understood that many variations are possible. Specific dimensions and materials can change as will be understood by those skilled in the art depending upon the conditions of operation and parameters necessary in any particular application. Similarly, actuating mechanism for actuating the streamline strut members can vary. The specific configuration of the passageway can vary. The use of direction terms such as "top," "bottom," "front" and "back" are for illustrative purposes only and it will be obvious that the streamline strut members can be positioned horizontally or at angles to the vertical. Similarly, although three identical streamline members are shown and described, the number and size can vary greatly depending upon the particular application. In some cases, the members need not be identical so long as provision is made for expansion to permit closure of the valve. In all cases, flexible seals are formed in which the elastic deforming of the skin provides good sealing in the closed position with minimum leakage and minimizes pressure drop due to turbulence in open positions.

What is claimed is:

1. A damper valve for use in high temperature gas streams where high pressures on said valve are encountered, said valve comprising, means defining a gas passageway, a plurality of elongated damper members arranged in operative relationship to each other arranged in a row extending from side to side of said gas passageway with each of said damper members defining opposed ends, said damper members each defining a first outer skin configuration with the skin being formed of a high temperature resistant flexible material, means for providing backup stiffening to selected portions of said skin exposed to high gas pressure including internal structural support means for each damper member having higher stiffness than said skin, sealing means for sealing said gas passageway near said opposed damper member ends, and mechanical means for changing said skin configuration of each member to a second configuration to cause said skin to close said passageway to gas flow when desired.

2. A damper valve in accordance with claim 1 wherein said first outer skin configuration is streamline, said second configuration is within the elastic limit of said skin material, and said mechanical means further provides a plurality of streamline skin configurations intermediate said first and second configurations.

3. A damper valve in accordance with claim 2 wherein said means for changing said configuration acts to constantly provide a symmetrical skin shape with respect to a direction of gas flow.

4. A fluid damper valve in accordance with claim 2 wherein said gas passageway is rectangular and said skin in said second configuration is resiliently biased along contact sealing areas to form a resilient gas seal resistant to leakage under differential temperature gradients.

5. A fluid damper valve in accordance with claim 4 wherein said skin of each damper member defines a substantially continuous cross sectional configuration at planes perpendicular to its length in said first and said second configuration.

6. A fluid damper valve in accordance with claim 2 wherein said damper members in said second configuration define a discontinuous cross sectional configuration in said planes.

7. A damper valve in accordance with claim 1 wherein said internal structural support means has a higher coefficient of thermal expansion than said skin material to aid in preventing buckling of said skin at conditions of differential temperature between said skin and internal structure.

8. A damper valve in accordance with claim 1 wherein each of said damper members is an elongated member and is mounted on said means defining a gas passageway by means for permitting sliding in said mounting to avoid problems due to thermal expansion and contraction.

9. A damper valve in accordance with claim 8 wherein said sealing means comprise a plurality of seal plates positioned in said passageway to seal portions of said passageway upon expansion of said skin configuration.

10. A damper valve in accordance with claim 9 wherein said mechanical means for changing said skin configuration comprises a drive plate operatively engaged with a plurality of push rods mounted to exert internal pressure on said skin configuration to change said skin configuration while maintaining a substantially streamline configuration at all times during said change.

11. A damper valve in accordance with claim 10 wherein said skin of each damper member is internally supported at a forward portion thereof by stiffener plates in a hinge bar arrangement.

12. A damper valve in accordance with claim 11 wherein said stiffener plates are pivotally linked to said push rods at edges thereof.

13. A damper valve in accordance with claim 12 wherein said internal support means comprises a mounting post which substantially supports a damper member in said gas passageway, said post being fixed to said means defining said gas passageway at one end only whereby said post permits thermal expansion thereof in use.

14. A fluid damper valve in acordance with claim 13 and further comprising hinge member means linked to said drive plate and post for internally supporting said skin.

15. A damper valve in accordance with claim 9 wherein said seal plates comprise a plurality of sealing edges capable of forming a labyrinth seal upon expansion of said skin configuration.

* * * * *